United States Patent [19]
Beer

[11] Patent Number: 6,003,670
[45] Date of Patent: *Dec. 21, 1999

[54] ABUSE RESISTANT FLEXIBLE PACKAGE

[75] Inventor: Jeffrey Scott Beer, Perkiomenville, Pa.

[73] Assignee: Fres-co System USA, Inc., Telford, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/688,594

[22] Filed: Jul. 30, 1996

[51] Int. Cl.$^6$ .................................................. B65D 30/02
[52] U.S. Cl. .................. 206/459.5; 206/484; 206/524.2; 383/113; 428/34.3; 428/35.2
[58] Field of Search ................................. 206/459.5, 484, 206/524.2, 524.8; 383/94, 109, 113, 116; 428/34.3, 35.2, 35.4, 479.6

[56] References Cited

U.S. PATENT DOCUMENTS

| | | |
|---|---|---|
| 3,386,645 | 6/1968 | Powell ..................................... 383/116 |
| 3,412,925 | 11/1968 | Booth et al. ............................. 383/113 |
| 4,424,260 | 1/1984 | Pupp ....................................... 428/34.3 |
| 4,686,125 | 8/1987 | Johnston et al. ........................ 383/116 |
| 4,700,838 | 10/1987 | Falciani et al. .......................... 383/116 |
| 4,874,656 | 10/1989 | Rantanen .............................. 206/524.2 |
| 4,983,431 | 1/1991 | Gibbons et al. . | |

FOREIGN PATENT DOCUMENTS

| | | |
|---|---|---|
| 0 223 531 | 11/1986 | European Pat. Off. . |
| 2362769 | 3/1978 | France ................................... 383/109 |
| 740514 | 11/1955 | United Kingdom ................... 383/116 |

OTHER PUBLICATIONS

Abstract of JP 01 286 842 (Nov. 1989).

*Primary Examiner*—Jimmy G. Foster
*Attorney, Agent, or Firm*—Caesar, Rivise, Bernstein, Cohen & Pokotilow, Ltd.

[57] ABSTRACT

A package for holding abrasive, greasy or oily material, such as dry pet food. The package is formed of a web of flexible material and has an outer surface and an inner surface. The web comprising plural layers adhesively secured to one another. The layers are in sequence from the outer surface of the package to the inner surface thereof. The sequence of layers is a first film layer formed of a heat resistant and temperature resistant material, e.g., polyester film, a second layer formed of a shock-absorbing and heat resistant paper, e.g., Kraft paper, a third film layer formed of a puncture resistant, heat resistant barrier material, e.g., nylon, which also forms a gas and chemical barrier, and a fourth film layer formed of a moisture resistant sealable film material, polyethylene. The outer layer is transparent and indicia is provided between it and the paper layer so that the indicia is visible through the outer layer.

15 Claims, 1 Drawing Sheet

U.S. Patent Dec. 21, 1999 6,003,670
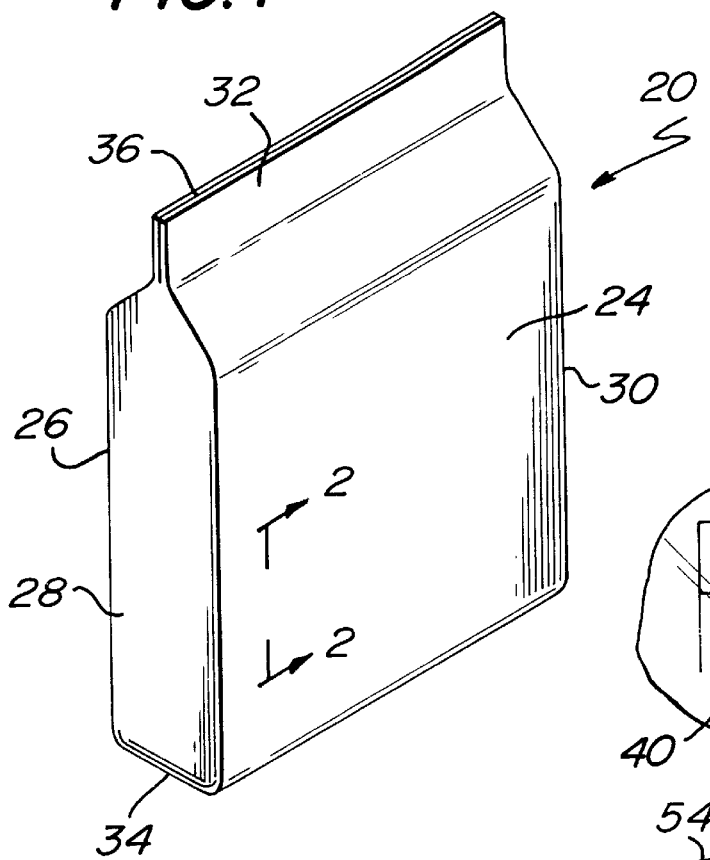
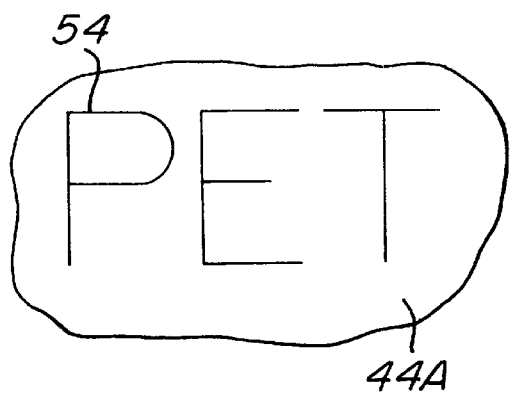
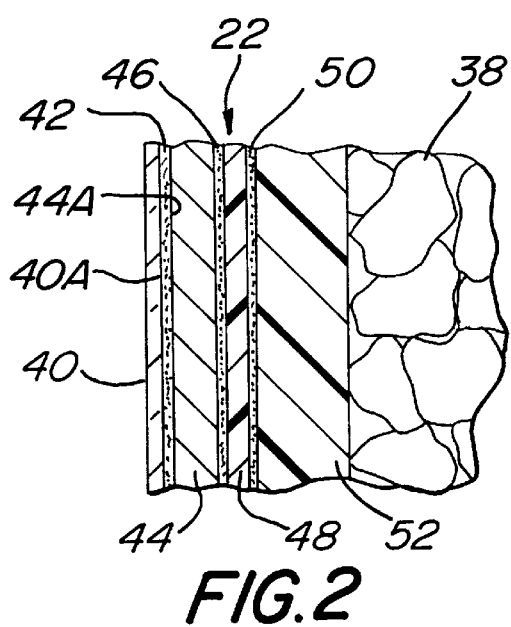

ABUSE RESISTANT FLEXIBLE PACKAGE

SPECIFICATION

BACKGROUND OF THE INVENTION

This invention relates generally to flexible packages, and more particularly to flexible packages for particulate products, such as dry pet foods, and which tend to be abrasive.

There are a multitude of laminated materials used to package dry products, such as roasted and ground coffee, active dry yeast, roasted peanuts, etc., under vacuum. The following are some of these laminated materials (where the "/" symbol represents an adhesive interface between the adjacent layers and wherein the materials are listed in sequence from the outside of the package to the inside thereof): polyester film/aluminum foil/nylon film/ polyethylene film; polyester film/aluminum foil/ polyethylene film; polyester film/polypropylene film/ aluminum foil/polyethylene film; polyester film/nylon film/ polyethylene film; polyester film/aluminum foil/polyester film/polyethylene film; polypropylene film/aluminum foil/ polyethylene film; nylon film/aluminum foil/polyethylene film; and others. Some of the above vacuum package constructions are further protected with a layer of Kraft paper or Kraft paper laminated with another material, such as polyester film or aluminum foil. The paper construction is either wrapped around the finished vacuum package, combined with the vacuum material on the packaging machine prior to filling, vacuumizing and sealing, or produced as a "Double Wall" construction, such as described in my U.S. Pat. No. 4,727,706.

Moreover, various types of flexible packages for holding dry cat, dog, or other pet foods, are commercially available. For example, such packages may be formed of a heavy paper, like Kraft paper, and having an inner lining of a plastic or wax to provide a moisture barrier and to prevent any oil or grease in the pet food from staining the paper.

In U.S. Pat. No. 5,491,011 (Pezzoli et al.) there is disclosed a flexible sheet material for forming packages for dry pet foods which have an odoriferous component. The structure of that sheet material from the inside of the package to the outside comprises linear low density polyethylene, high density polyethylene, linear low density polyethylene, a barrier resin such as ethylene vinyl alcohol copolymer, and low density polyethylene.

Unfortunately dry pet foods frequently exhibit sharp edges or particles (e.g., in some cases the pet food may include particles of bone), and tend to abrade the flexible material making up the package. Thus, it is necessary that the material forming the packaging for such particulate material pet foods be resistant to abrasion or abuse. Moreover, it is desirable that the material forming the package be capable of holding the contents of the package under vacuum, be moisture and odor impervious, and be resistant to grease or oil.

Heretofore, flexible packaging of various types of plastic films and/or foils which have been commercially available for holding free flowing products under vacuum have not proven to be generally suitable for sharp edged dry pet foods. Thus, a need exists for a flexible package which can hold such materials under vacuum, yet which exhibits substantially reduced package leakage due to abuse as compared to other typical flexible materials.

OBJECTS OF THE INVENTION

Accordingly, it is a general object of this invention to provide a flexible package for dry pet foods and other similar abrasive and/or oily/greasy products which addresses that need.

It is a further object of this invention to provide a flexible package formed of a multi-layer material which can be fabricated readily.

It is still further object of this invention to provide a flexible package formed of a multi-layer material which is relatively low in cost.

It is yet a further object of this invention to provide a flexible package formed of a multi-layer material which can be decorated readily with any desired graphic indicia.

SUMMARY OF THE INVENTION

These and other objects of the instant invention are achieved by providing a flexible package having an interior for holding particulate material, e.g., dry pet food, which tends to be abrasive and/or oily/greasy. The package is formed of a web of flexible material, comprising plural layers in sequence starting from the outer surface of the package to its inner surface: a first film layer formed of a heat resistant and temperature resistant material, a second layer formed of a shock-absorbing and heat resistant paper, a third film layer formed of a puncture resistant, heat resistant barrier material which also forms a gas and chemical barrier, and a fourth film layer formed of a moisture resistant, sealable film material. The layers are secured to one another to form a unitary web. The web is formed into a package of any desired shape and/or size.

In accordance with one preferred aspect of this invention the outer layer of the material forming the package is transparent, and indicia, e.g., the name of the product, its description, graphics, etc., is provided between that outer layer and the paper layer to be visible through the outer layer.

DESCRIPTION OF THE DRAWING

FIG. 1 is an isometric view of one exemplary package constructed in accordance with this invention;

FIG. 2 is a greatly enlarged sectional view taken along line 2—2 of FIG. 1 to clearly show the laminated multi-layer material used to form the package of FIG. 1;

FIG. 3 is an enlarged isometric view of portion of the package shown in FIG. 1 showing a portion of the transparent outer layer of the package peeled upward to show the positioning of indicia, e.g., a description of the contents of the package, trademarks, graphics, etc., which is printed in reverse, on the inner surface of that layer to be visible therethrough; and FIG. 4 is an enlarged isometric view of portion of a package like that shown in FIG. 1 wherein the package includes the indicia which is instead printed un-reversed on the outer surface of an intermediate layer of the package to be visible through the transparent outer layer of the package.

DETAILED DESCRIPTION OF THE PREFERRED EMBODIMENT

Referring to FIG. 1, there is shown at 20 in FIG. 1 a package designed to hold dry pet foods, such as dog and cat food, under vacuum with substantially reduced package leakage due to abuse as compared to other typical flexible packaging materials for foodstuffs. The package 20 is formed of a web 22 of material having multiple layers (to be described later with reference to FIG. 2), each of which provides one or more desired characteristics for the package.

It should be pointed out at this juncture that the description to follow represents one specific package, which is purely exemplary of many types of packaging which can be constructed in accordance with this invention. Thus, the subject invention should not be deemed to be limited to the specific types of material forming the various layers of the package 20 or the specific type of package (i.e., its shape, size, etc.).

As can be seen in FIG. 1 the package 20 is of the gusseted type and includes a front wall panel 24, a rear wall panel 26 and a pair of interposed side gussets 28 and 30. The panels and gussets are preferably formed from a single web of material 22 which is formed into a tube and seamed along a longitudinal (e.g., vertical) seam (not shown) in a conventional manner. The finished package 20 includes a top edge portion 32 and a bottom edge portion 34. The bottom edge portion is permanently sealed. Preferably the top edge portion 32 is releasably sealed, i.e., the panels 22 and 24 are releasably sealed together along their respective top edges, to form a mouth 36 providing access to the contents of the package.

It should be pointed out that the package 20 may, alternatively, be in the form of a simple pouch or sack, wherein there are no gussetted sides. In such an alternative arrangement the package may be formed of a pair of sheets of material 22 constructed in accordance with this invention and sealed along their peripheral edges. The top edge of that alternative package would also be preferably releasably sealed to form a mouth for the package. It is to be understood that other package configurations are contemplated within the scope of this invention.

Irrespective of the shape of the package 20 it is preferably constructed so that once it is filled and sealed under vacuum, it can hold pet food 34 (FIG. 2) or other sharp edged particulate material therein under vacuum, without leakage, even if the package is subject to rough handling or abuse.

When opened the package's mouth 36 provides access to the pet food 38 within the interior of the package. The releasable securement of the mouth of the package is accomplished in any conventional manner by the sealing of the inner layers (to be described later) of the material forming the panels of the package to each other.

Turning now to FIG. 2 it can be seen clearly that the web 22 of material forming the package 20 is a laminate including four distinct layers of different materials which are securely bonded to one another, e.g., with an adhesive. In particular, the layers forming the package, listed from the outside of the package to the inside are as follow's polyester film 40, an adhesive 42, Kraft paper 44, an adhesive 46, nylon film 48, adhesive 50, and polyethylene film 52. The thickness of each layer can vary within the following exemplary constraints. The polyester film 40 is in the range of 0.00025 inch (0.0064 mm) to 0.00142 inch (0.036 mm), with one particularly suitable thickness of 0.00048 inch (0.012 mm). The Kraft paper 44 is in the range of 0.001 inch (0.025 mm) to 0.004 inch (0.1 mm), with one particularly suitable thickness of 0.0019 inch (0.048 mm). The nylon film 48 is in the range of 0.00048 inch (0.012 mm) to 0.002 inch (0.05 mm), with one particularly suitable thickness of 0.0006 inch (0.015 mm). The polyethylene film 52 is in the range of 0.001 inch (0.025 mm) to 0.008 inch (0.2 mm), with one particularly suitable thickness of 0.004 inch (0.4 mm). The adhesive layers 42, 46, and 50 are each formed of polyester urethane of a thickness in the range of 0.0001 inch (0.0025 mm) to 0.001 inch (0.025 mm), with one particularly suitable thickness of 0.0002 inch (0.005 mm).

Each individual layer of the packaging provides distinctly different properties to the laminate. In this regard, the polyester film 40 provides abrasion resistance, heat resistance and a clear or transparent glossy surface. As can be seen clearly in FIG. 2 the layer 40 includes an inner surface 40A, i.e., the surface immediately adjacent the adhesive layer 42, which is arranged to be reverse printed with any indicia 54, e.g., trademarks, identification of the contents, graphics, etc. Such printing is accomplished by using conventional printing inks applied to the inner surface 40A of the layer 40. The reverse printed side of the layer 40 is coated with the adhesive 42 and laminated to the Kraft paper layer 44. In this way the ink is trapped under the clear polyester film layer 40 and protected from scuffing. Alternatively, the printing may be applied directly to the outer surface 44A (FIGS. 2 and 3) of the Kraft paper layer to be visible through the adhesive layer 42 and the polyester film layer 40, with the printing again being protected from scuffing by the polyester layer.

The Kraft paper layer 34 provides a soft, shock absorbing layer. In addition, the paper is resistant to heat. If the paper is bleached white, it provides an excellent background for the printed indicia. This may eliminate the need to back-up the indicia with white ink or a white adhesive so that it can be readily seen.

The inner surface of the Kraft paper layer 44 is coated with the adhesive 46 and laminated to the nylon film layer 48. Alternatively, the adhesive 46 may be coated on the nylon layer and laminated to the inner surface of the Kraft paper layer. In any case the nylon layer 48 provides resistance to puncture, a gas barrier (especially to oxygen), an odor barrier (to protect the product packaged from picking up off-odors) and a barrier to chemicals and fats (to prevent ingredients of the pet food product packaged from migrating through the other materials, e.g., the Kraft paper layer). Nylon is also resistant to heat.

The polyethylene film layer 50 provides a barrier to moisture vapor. It is also the material used to form hermetic seals through thermal welding (or otherwise) since it forms the inner surface for the package 20. In this regard the inner surface of the film layer 50 forming the front panel 24 is releasably heat sealed to the inner surface of the film layer 50 forming the rear panel 26 in a conventional manner, so that those layers will maintain a vacuum within the package, yet can be readily peeled apart to form the package's mouth.

It must be pointed out at this juncture that the term "polyethylene" is used herein to describe a number of sealant materials and is not meant to limit this invention. Thus, sealants, such as low density polyethylene, linear low density polyethylene, medium density polyethylene and high density polyethylene all can be described as "polyethylene" and are suitable for this invention. Other useful sealants are ethylene vinyl acetate (up to 30% VA content), ionomers, polypropylene, polybutylene, EAA, EMA, etc. The selection of the sealant layer material is dependent on the product packaged, the seal strength expectations, and especially sealing method and conditions. In addition, the sealant can be a blend of the above materials or a coextrusion of the above materials in order to provide additional specific properties such as hot tack, easy open seals, and improved stiffness.

The adhesive layers provide secure bonding of the film layers to one another under the conditions of package use. The adhesive selection of choice is polyester-urethane, due to its heat and chemical resistance. This adhesive is applied to the film in solution. The liquid carrier is driven off using hot air leaving a thin layer of the adhesive. The adhesive is then thermally bonded to the second film. Other adhesives and other laminating processes are well known in the converting industry and may be useful for the production of the laminated material of the package of this invention. In this regard so-called "polymounting", where molten polymer instead of adhesive is used to bond two films together, may be used to form the packaging of in this invention. Also thermal lamination could be used to bond the sealant layer to the nylon layer.

While the prior art flexible packaging materials may provide some level of protection against abuse-induced damage, e.g., leakage of vacuum packaged dry pet foods, the material of the subject invention goes beyond these known materials to provide abuse resistance substantially, e.g., 50%, greater, than these materials.

Without further elaboration the foregoing will so fully illustrate my invention that others may, by applying current or future knowledge, adopt the same for use under various conditions of service.

I claim:

1. A package having an interior for holding particulate material therein, the particulate material tending to be abrasive and oily or greasy, said package being formed of a web of flexible material comprising in sequence:
   (a) a first film layer formed of a heat resistant and abrasion resistant material,
   (b) a second layer formed of a shock-absorbing and heat resistant paper,
   (c) a third film layer consisting of one puncture resistant, heat resistant barrier material, said barrier material also forming a gas and chemical barrier, and
   (d) a fourth film layer formed of a moisture resistant, sealable polyethylene film,
   wherein said layers of said flexible web are secured to one another whereupon said web is integral, each layer is formed of a material different from the other three layers, said first film layer comprises the exterior surface of said package and said fourth film layer comprises the interior surface of said package.

2. The package of claim 1 wherein said first film layer comprises a polyester film.

3. The package of claim 1 wherein said second layer comprises Kraft paper.

4. The package of claim 1 wherein said third film layer comprises nylon film.

5. The package of claim 1 wherein said package is sealable by said sealable film, and when sealed is capable of maintaining the particulate material therein under vacuum.

6. The package of claim 1 wherein said layers are secured to each other by respective adhesive layers.

7. The package of claim 6 wherein each of said adhesive layers comprises polyester urethane.

8. The package of claim 1 wherein said first film layer is transparent, and wherein said package includes indicia located between said first film layer and said second layer, whereupon said indicia is visible through said first film layer.

9. The package of claim 7 wherein said first film layer includes an inner surface immediately adjacent said second layer, and wherein said indicia is reverse printed on said inner surface of said first film layer.

10. The package of claim 1 wherein said second layer comprises Kraft paper and said third film layer comprises nylon film.

11. The package of claim 1 wherein said first film layer comprises polyester film, said second layer comprises Kraft paper, and said third film layer comprises nylon film.

12. The package of claim 1 wherein said first film layer comprises polyester film and said second layer comprises Kraft paper.

13. The package of claim 1 wherein said first film layer comprises polyester film and said third film layer comprises nylon film.

14. A package having an interior for holding particulate material therein, the particulate material tending to be abrasive and oily or greasy, said package being formed of a web of flexible material comprising in sequence:
   (a) a first film layer formed of a heat resistant and abrasion resistant polyester film,
   (b) a second layer formed of a shock-absorbing and heat resistant Kraft paper,
   (c) a third film layer formed of a barrier material comprising nylon film, wherein said barrier material is puncture resistant, heat resistant and forms a gas and chemical barrier, and
   (d) a fourth film layer formed of a moisture resistant, sealable polyethylene film,
   wherein said layers of said flexible web are secured to one another whereupon said web is integral, and wherein said first film layer comprises the exterior surface of said package and said fourth film layer comprises the interior surface of said package.

15. The package of claim 14 wherein said package is adapted to maintain the particulate material therein under vacuum.

* * * * *